United States Patent
Highgate et al.

(10) Patent No.: US 8,399,153 B2
(45) Date of Patent: Mar. 19, 2013

(54) PRODUCTION OF MEMBRANE ELECTRODE ASSEMBLIES AND STACKS THEREOF

(75) Inventors: Donald James Highgate, Surrey (GB); Jonathan Anthony Lloyd, Sheffield (GB); Simon Bourne, Sheffield (GB); Rachel Louise Smith, Sheffield (GB)

(73) Assignee: ITM Power (Research) Limited, South Yorkshire (GB)

( * ) Notice: Subject to any disclaimer, the term of this patent is extended or adjusted under 35 U.S.C. 154(b) by 1026 days.

(21) Appl. No.: 11/597,984

(22) PCT Filed: Jun. 16, 2005

(86) PCT No.: PCT/GB2005/002376
§ 371 (c)(1),
(2), (4) Date: Dec. 29, 2006

(87) PCT Pub. No.: WO2005/124915
PCT Pub. Date: Dec. 29, 2005

(65) Prior Publication Data
US 2008/0063920 A1    Mar. 13, 2008

(30) Foreign Application Priority Data
Jun. 16, 2004   (GB) .................... 0413515.8

(51) Int. Cl.
*H01M 8/02* (2006.01)
*H01M 8/10* (2006.01)
*L08J 5/20* (2006.01)
*B05D 5/12* (2006.01)

(52) U.S. Cl. ........ 429/535; 429/483; 429/492; 429/530; 521/27; 427/115

(58) Field of Classification Search ............ 429/33, 429/41, 40, 444, 494, 483, 530, 535; 204/252, 204/282, 294; 521/27; 427/115
See application file for complete search history.

(56) References Cited

U.S. PATENT DOCUMENTS

| | | | |
|---|---|---|---|
| 4,124,477 A * | 11/1978 | Tokawa et al. | 204/252 |
| 5,164,060 A * | 11/1992 | Eisman et al. | 204/282 |
| 5,284,718 A | 2/1994 | Chow et al. | |
| 5,460,896 A | 10/1995 | Takada et al. | |
| 5,635,039 A * | 6/1997 | Cisar et al. | 204/252 |
| 5,656,389 A * | 8/1997 | Tetzlaff et al. | 429/41 |
| 6,552,107 B1 * | 4/2003 | Paul et al. | 524/158 |
| 2003/0008190 A1 * | 1/2003 | Chisholm et al. | 429/33 |
| 2003/0113603 A1 | 6/2003 | Highgate | |
| 2003/0209428 A1 | 11/2003 | Hirahara et al. | |
| 2004/0028977 A1 * | 2/2004 | Pickup et al. | 429/33 |

FOREIGN PATENT DOCUMENTS

CN    1 443 885 A    9/2003

OTHER PUBLICATIONS

"Novel Composite Membranes for Fuel Cells", California Energy Commission, p. 1-8, Mar. 2003. Retrieved online on Feb. 28, 2011 from: http://www.energy.ca.gov/research/innovations/eisg_final_reports/500-03-017/500-03-017.PDF.*

"Polymer electrodes doped with heteropolymetallates and their use within solid-state supercapacitors", White et al., Synthetic Metals 139 (2003), pp. 123-131.*

Yi et al., Fuel Cells—Principle, Technology, Application, Chemical Industry Press, Beijing, Aug. 2003.

* cited by examiner

*Primary Examiner* — Basia Ridley
*Assistant Examiner* — Kenneth Douyette
(74) *Attorney, Agent, or Firm* — Saliwanchik, Lloyd & Eisenschenk

(57) ABSTRACT

In a method for the production of a membrane electrode assembly comprising a membrane, electrodes and a catalyst, the catalyst is pressed into the membrane material, e.g. when forming the material in situ.

9 Claims, 6 Drawing Sheets

Polyethylene catalyst transfer material

Catalyst coating

Liquid monomer

☐ Polyethylene sheet

■ Catalyst coating

▨ Non woven separator

PRODUCTION OF MEMBRANE ELECTRODE ASSEMBLIES AND STACKS THEREOF

CROSS-REFERENCE TO A RELATED APPLICATION

This application is a National Stage Application of International Application Number PCT/GB2005/002376, filed Jun. 16, 2005; which claims priority to Great Britain Application No. 0413515.8, filed Jun. 16, 2004.

FIELD OF THE INVENTION

The present invention relates to a method for the production of membrane electrode assemblies (MEA's) and stacks thereof.

BACKGROUND OF THE INVENTION

The production of electrochemical cells as described in GB2380055 involves polymerisation of ionically conducting material in situ, in a space or cavity. In order that the resulting structure should have the requisite electrical properties, there is commonly a need for the presence of a catalyst in, on or adjacent to each surface of the ionically active material.

In conventional electrochemical structures (e.g. fuel cells and electrolysers) and photo-electrochemical devices (e.g. photovoltaic, direct dissociation and photo-augmented electrochemical cells), where the ionically active material is either (i) in the form of a thermoplastic membrane (such as Nafion) or (ii) a liquid lye (acid or alkaline), the catalyst is usually introduced in one of two ways, as follows:

(i) The catalyst is provided in the form of finely divided particles which are separate or, in the case of a supported catalyst, attached to some matrix material (typically carbon particles or carbon paper when the carbon paper may additionally serve as the electrode). In this form, the catalyst is distributed uniformly over the surface of the membrane and pressed under the action of heat and pressure (for Nafion, typically 140° C. and 690 kPa) into the surface of the thermoplastic membrane. The objective is that the catalyst forms a uniform layer in intimate contact with the ionomer but accessible to the action of the reactant adjacent to the membrane surface, as shown in FIG. 1.

(ii) The catalyst is prepared as a layer on a surface defining the electrochemical cell. For example, in the case of a photovoltaic cell, the cell is constructed of two glass sheets coated with a transparent electrode (tin oxide) which is further coated with a catalyst (titanium dioxide to form one electrode and platinum to form the second) in the form of an insoluble layer attached to the glass/tin oxide surface. The resulting surface is then exposed to the liquid lye to complete the cell.

Problems associated with the use of these systems are well known. The solid polymer Nafion is inevitably dry during the deposition of the catalyst due to the temperature needed to render the Nafion soft and deformable, but in order to be an effective ionic conductor the Nafion must be hydrated. During this process the material swells and tends to delaminate, disrupting precisely the contact needed between the polymer and the catalyst. The use of liquid conduction materials in the form of a lye is also well known, but the use of a liquid imposes constraints upon the design and operation of the cell.

SUMMARY OF THE INVENTION

The present invention describes various ways in which the catalyst can be introduced into the system so as to be compatible with the potential for low cost, high rate production of MEA's and stacks. These are given in the claims. The present invention can avoid problems of the type described above.

DESCRIPTION OF THE PREFERRED EMBODIMENTS

Figure 1:
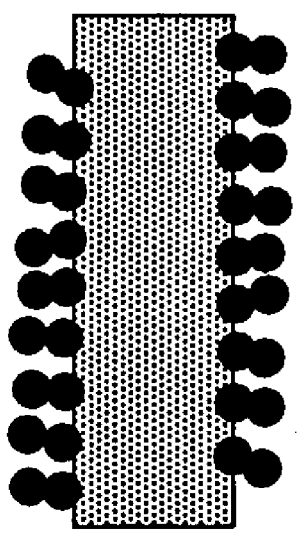
FIG. 1 is a schematic representation of the preferred arrangement between catalyst particles and ionomer.
Figure 1:

This membrane may be of any suitable material, including materials well known in the art, e.g. a rigid polymer such as Nafion. It is preferred that the MEA should include a hydrophilic membrane, e.g. as described in WO03/023890, the content of which is incorporated herein by reference. Products of this type as described above as "ITM-SPE". Other abbreviations used herein are: VP for vinyl pyrrolidone, MA for methacrylate, MMA for methyl methacrylate and CVD for chemical or controlled vapour deposition.

In general, the membrane material used in this invention is an ionomer and/or is hydrophilic. It will typically be hydrated in use, allowing the passage of ions.

Hydrophilic copolymers can be formed by the polymerisation from solution of a monomer mixture typically comprising:

(a) a hydrophobic/structural comonomer such as MMA (methyl methacrylate), AN (acrylonitrile), polyamide or TRIS, and (b) a hydrophilic but not necessarily electrically active comonomer such as VP (vinyl pyrrolidone) or HEMA (hydroxyethyl methacrylate).

The presence of both hydrophilic and hydrophobic monomers allows control of the electrical properties separately from the hydraulic properties, as may be appropriate for the separate requirements of a membrane and the membrane/catalyst/electrode interface. The relative amounts of these monomers allow controlled swellability, and allow the product to be rigid, or solid and elastic.

Cross-linked materials may be formed by using γ-irradiation or thermal irradiation. For example, ionising radiation, e.g. 90 MeV gamma radiation from a cobalt 60 source may be used, in which case no cross-linking agent needs to be added.

Nevertheless, it is possible to control the properties of the final material by the addition of:

(c) a chemical cross-linking agent such as allyl methacrylate or ethylene glycol dimethacrylate, and (d) a chemical initiator such as AIBN (azoisobutyronitrile) or azobiscyclohexanecarbonitrile.

If the material is to be thermally initiated and cross-linked, then components (c) and (d) above become essential to the process.

Such hydrophilic materials may be converted to electrically active systems, cationic or anionic, by the addition of:

(e) an electrically active molecule held within the matrix of the hydrophilic polymer; or (f) an electrically active comonomer.

The electrically active component can be based either upon an acid, e.g. a sulphonic acid ($SO_3$), phosphoric or phosphonic acid, or an alkali, e.g. a compound providing OH ions such as KOH, NaOH or ammonium hydroxide or vinylbenzyltrimethylammonium chloride. The preferred monomer is 2-acrylamido-2-methyl-1-propanesulphonic acid (AMPS), styrenesulphonic acid (SA), vinylsulphonic acid (VA) or SOMA. It is also possible that component (a) or (b) may be modified so that it also functions as component (f).

An electrically active molecule (e) may be held within the matrix by steric interference as an alternative to, or in addition to, chemical bonding. Addition of a swelling liquid (e.g. ethyl alcohol) to the hydrophilic polymer can cause greater swelling than with water. Ionically active molecules dissolved in the swelling liquid will exchange for water by diffusion and the polymer will shrink, thereby entrapping the molecules within the matrix. Such an effect is observed with 50:50 MMVA-VP copolymer and ionic molecules dissolved in ethyl alcohol.

One or more types of ionically active molecules can be introduced into the matrix using this method. Subsequent activation of the material by gamma-irradiation may cause a reaction between introduced molecules, to form a molecule larger than those entrapped by steric interference, and/or a binding reaction of an introduced molecule with the polymer matrix.

In a solid polymer electrolyte as used in any form of PEM system, the ionic conduction ($C_i$) should be very much greater than the electronic conduction ($C_e$). A $C_e/C_i$ ratio of less than 0.1 is desirable for successful operation.

Polymers suitable for use in the invention may be produced by polymerisation of the monomers and water or another liquid in which component (f) is soluble and with which the other components are miscible. The involvement of water is not fully understood, but as an acidic or alkaline solution it apparently acts as a comonomer and mediates the introduction of the acid or alkali moieties into the cross-linked polymer structure. After polymerisation, some or all of the water may be removed, but rehydration does not necessarily give the product obtained before drying.

Considerations that should be given to the materials include their hydrophilicity, for control of water and gas permeability independent of the electrical properties, and their cross-linking, for stability; the use of sulphonic acid, phosphoric acid, etc; the use of alkaline side chain for alkaline fuel cells; and the use of water or alcohol to carry the electrically active moiety into the polymer, the polar solution acting (unexpectedly) as a co-monomer. As the polymer, AN-VP plus AMPS is preferred, but other suitable monomer combinations include MMA-VP and MMA-HEMA.

In general, the catalyst may be prepared in several ways:

(a) as a slurry of solid particles in a support fluid, as an 'ink' which is then applied uniformly or as a predetermined pattern as a spray, or as a liquid by painting or spreading by any suitable technique including a doctor blade or 'ink jet' process;

(b) as a dry powder, such that the particles can be distributed uniformly or in a predetermined pattern to a surface by any suitable means including electrostatic spraying or rubbing into a textured surface; or (c) as a solution or reactant which is capable of being delivered as a liquid and precipitated or otherwise chemically deposited on the surface.

Preferred methods of the invention include the following Processes 1 to 7. ITM-SPE is given for the purpose of illustration only, and other materials may be used instead.

Process 1

A preformed catalyst layer is contacted, e.g. under pressure, with the surface of fully hydrated cross-linked hydrophilic ionically active material (the ITM-SPE). These materials are characterised by being soft and elastic when hydrated and in this form the surface is sufficiently soft and deforming to allow the catalyst particles to be brought into intimate contact by pressure alone. Thus two electrodes defining the boundaries of the cell are coated with catalyst by any suitable method, the catalyst is dried or cured to adhere to the electrode materials and the electrodes are pressed against the surface of a ITM-SPE membrane. Alternatively the coated electrodes are held apart by a fixed distance and the ITM-SPE material, initially dehydrated or pre-stressed to reduce its thickness, is introduced into the gap. On hydration, the ITM-SPE swells and makes contact with the electrodes, so imparting the necessary interfacial pressure to maintain good contact.

Alternatively, the catalyst layer can be applied to the hydrophilic surface and held in place by electrode surfaces pressed against the catalyst.

Process 2

In this procedure, solid catalyst particles are included in the surface of the ITM-SPE during polymerisation by a transfer process, e.g. catalyst is deposited onto a precursor material which is removed after polymerisation, leaving the catalyst particles on/in the surface.

Figure 2:
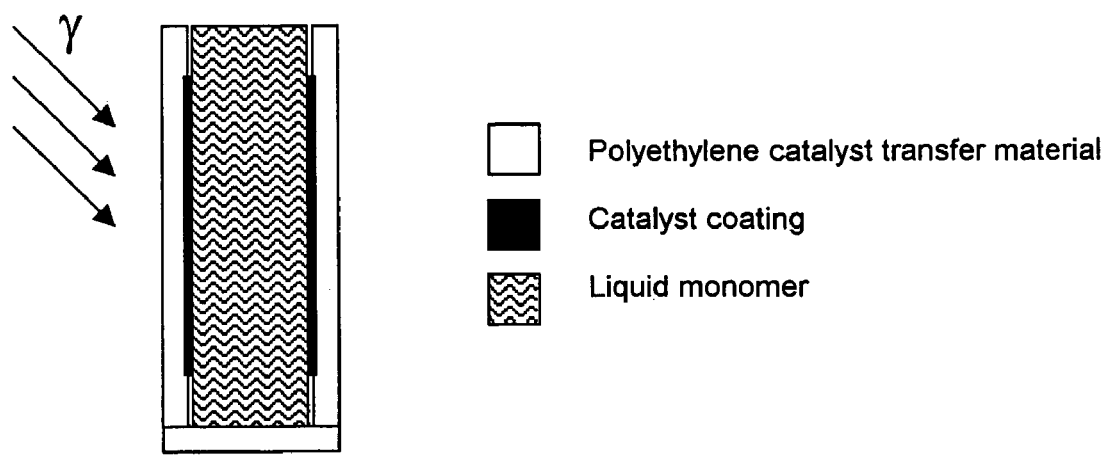
FIG. 2 is a schematic representation showing the cavity formed between catalyst coated transfer material filled with liquid monomer. Polymerisation in situ permits transfer material to be peeled away to reveal exposed catalyst in/on ionomer suface.

The solid catalyst particles are deposited (uniformly or in a defined pattern) onto the surface of a transfer medium by any suitable method (painting from an ink, spraying, CVD, dry-pressing, rolling, electrostatic attraction or precipitation from solution). The transfer medium should be flexible and insoluble in the hydrophilic monomer mixture (e.g. 100 μm polythene film). The coated transfer medium is then used to define the boundary or surface of the electrochemical cell and the monomer mixture introduced into the space between two such catalyst-coated transfer media and polymerised in situ, e.g. by gamma irradiation or thermal means, as shown in FIG. 2. When the polymerisation is complete (or at any suitable intermediate time), the transfer medium is peeled away, leaving the polymer surface exposed and containing the catalyst particles that previously adhered to the transfer medium.

Types of precursor material that can be used include a plastics or other sheet, e.g. of polyethylene, and preferably mechanically roughened/textured or corona discharge-treated. A silicone release paper or silicone sheet or precast block may also be used.

In each case, the catalyst may be applied, by way of example, as a paste using water or acrylonitrile with or without PTFE dispersion, as an 'ink' made with water and VP, optionally with polyethylene oxide as a wetting agent, or by pressing them into a thermoplastic sheet heated to a temperature above the glass transition temperature so that the catalyst particles are partially embedded into the surface of the transfer material.

Process 3

Solid catalyst particles are deposited (e.g. painting from an ink, spraying, CVD, dry-pressing, rolling, electrostatic attraction, electroplated or precipitation from solution) onto the surface of a suitable electrode material (e.g. uniaxial carbon fires or fine metal mesh) and heated or otherwise pre-treated to render the catalyst active and permanently attached to the electrode material. The catalyst-coated electrode may be crimped, if desired, in advance of polymerisation in situ and/or pressing into a film; this may reduce the internal stresses of the system during hydration. The catalysed surface of the electrode material may then be pressed against the surface of a suitable thermoplasticfilm (e.g. of polythene) at a temperature above the glass transition point of the film so that the catalyst particles are partially impressed into the surface of the film. This covering of the surface of the catalyst-coated electrode provides a barrier, to prevent the polymer mixture encapsulating the catalyst-coated electrode; this is an optional stage in the process: in some cases such blinding may not be necessary, for example when a liquid oxidant and a liquid fuel are going to be used for cell applications.

Figure 3:
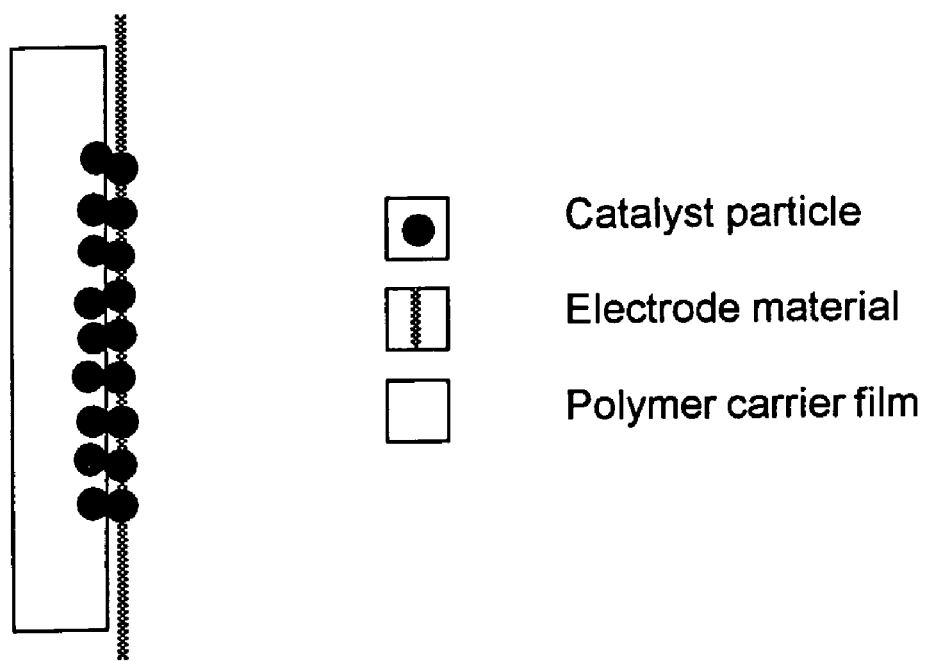
FIG. 3 is a schematic representation of a polymer carrier film incorporating catalyst-coated electrode material. Two such pieces can be used as the sides of a mould cavity.
Figure 4:
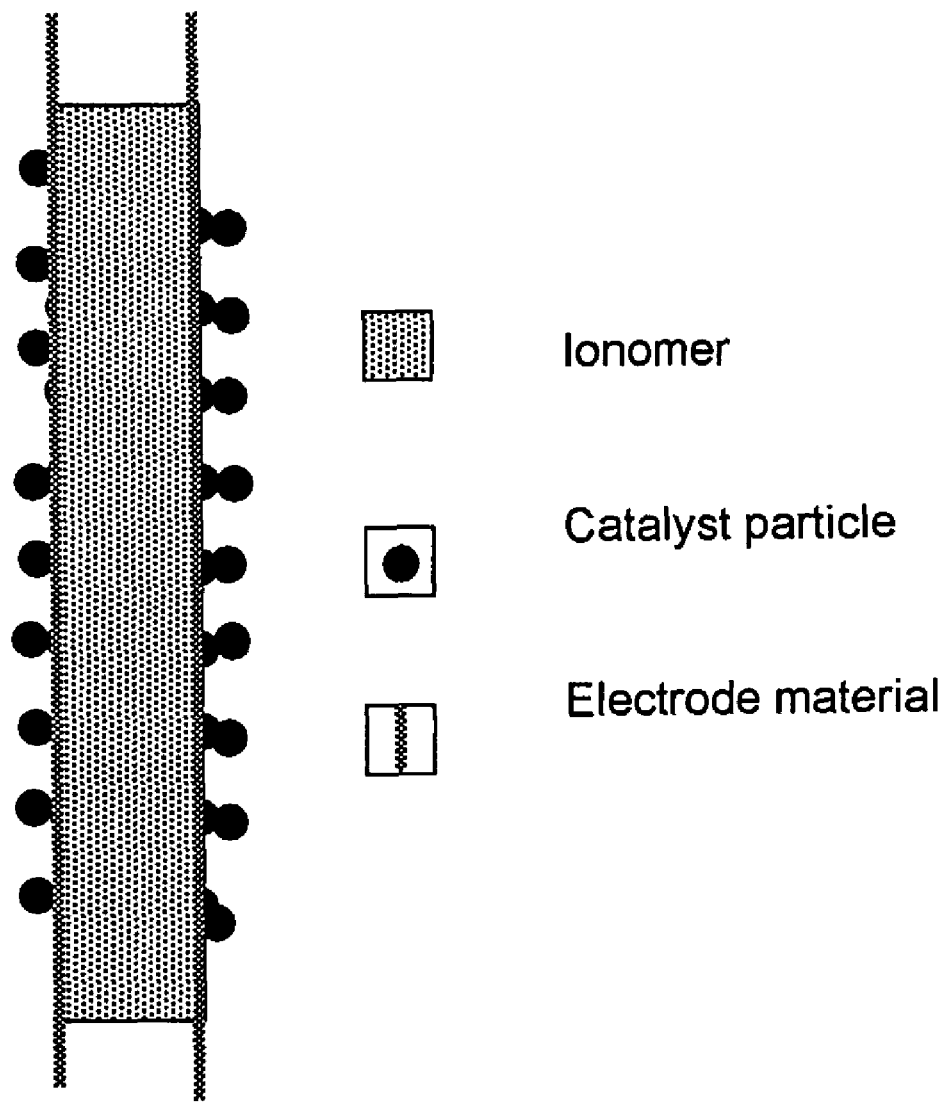
FIG. 4 is a schematic representation of MEA structure post-polymerisation, between two structures of the type shown in FIG. 3. The polymer carrier film has been peeled away to reveal the electrode material buried within the polymer, and catalyst particles are exposed to reactants.

The polymer film carrying the catalyst layer and electrode material are then used as the defining surface of the electrochemical cell (as shown in FIG. 3) and the ionomer in liquid form is introduced into the resulting gap. The ITM-SPE material is then polymerised in situ and the polymer film peeled away, exposing the catalyst particles on the surface, as shown in FIG. 4. In cases where the catalyst-coated electrode has not been pressed into a film, a mould is required to determine the edge of the electrochemical cell. This can be provided by a rigid structure or a film such as polythene. In each case, the resulting MEA has a novel structure in that the electrode is buried within the ionomer rather than exposed on the surface as in a conventional system. A major advantage of this system is that the catalyst can be heat-treated to maximise its effectiveness because the electrode material can be chosen to be resistant to the processing steps necessary for the catalyst. The use of a thermoplastic precursor material results in the catalyst particles being protected from encapsulation by the (initially) liquid monomer mixture; this ensures that there is excellent contact with the reactant (oxygen and hydrogen in the case of a fuel cell). In the case of liquid fuels and oxidants for fuel cells, this protection may not be necessary.

Process 4

Solid catalyst particles are introduced onto the surface of an ITM-SPE material which has been pre-gelled to form a viscous pre-polymer; the polymerisation process is subsequently completed. The pre-gelling prevents the particles from being entirely coated with polymer, while the subsequent completion of the polymerisation process achieves permanent attachment of the catalyst particles to the finished polymer surface. Alternatively, the catalyst particles can be introduced into a pre-polymer and spread on the surface of a finished polymer membrane.

Process 5

This method utilises the pre-stressed recovery properties of cross-linked hydrophilic materials; it is known that hydrophilic materials may be pre-stressed so that when hydrated they change shape in a controlled and predictable fashion. This process is also available to ionically active materials provided that they are also cross-linked and hydrophilic as is the case in the preferred ITM-SPE systems.

Figures 5A, 5B, 5C:
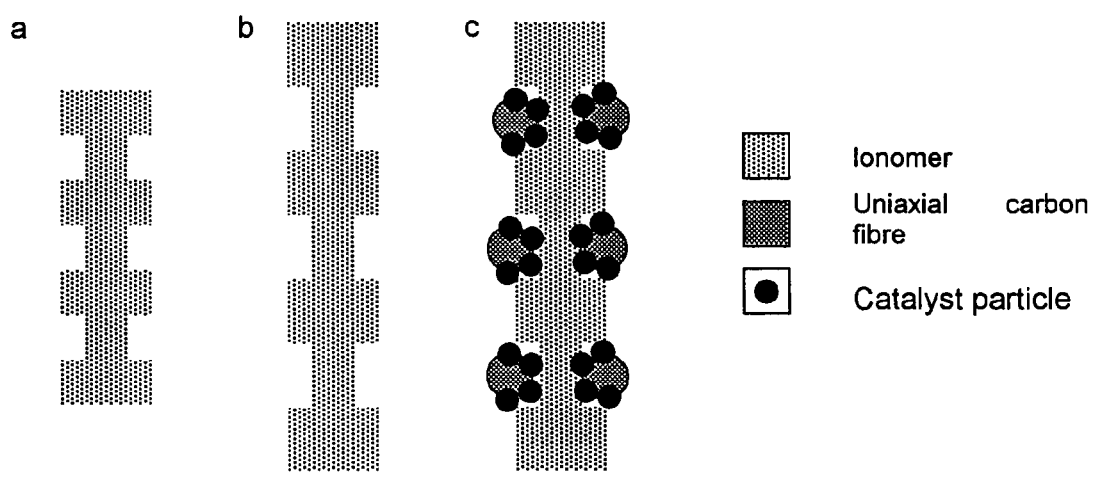
FIGS. 5(a), 5(b) and 5(c) are schematic representations of (a) the ionomer cast with surface profile, (b) profiled ionomer pre-stressed, and (c), surface profile of ionomer filled with catalyst coated uniaxial carbon fibres. On hydration, ionomer will try to revert to the shape shown in (a), gripping hold on the catalyst/electrode structure while doing so. The result is an MEA structure.
Figure 6:
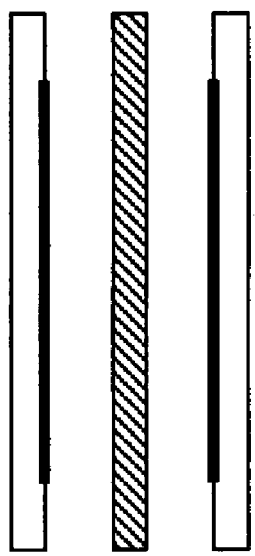
FIG. 6 is a schematic representation referring to Example 2.

If a cross-linked hydrophilic ionomer is cast with a surface profile, as shown by way of example only in FIG. 5a, and pre-stressed to the form shown in FIG. 5b, it will retain this second profile until hydrated.

Solid catalyst particles or catalyst particles attached to a suitable electrode structure (e.g. uniaxial carbon fibres as described in Process 3) and introduced into the surface profile, as shown in FIG. 5c, will be trapped and held securely when the hydrophilic material is hydrated and undergoes recovery to its initial form. If correctly sized, the hydrophilic material will exert sufficient force on the catalyst particles to ensure good electrical contact with access to the reactant gases.

Clearly, this process can be achieved with a wide rage of surface profiles, and indeed there is no absolute need to provide the electrode as a base for the catalyst because the catalyst particles will be held securely in a suitably profiled hydrophilic surface after shape recovery and the electrode can be attached later by any suitable means including simple pressure. In addition, this shape recovery method may be used to hold in place catalyst-coated electrodes.

Process 6

In this method, catalyst is initially applied as a liquid, in solution, as a micro-emulsion or by reaction from gaseous precursors. For a catalyst which can be deposited from aqueous solution, it may be applied to the hydrated ITM-SPE surface and deposited onto the surface of the ionomer, the electrode being formed integral with the ionomer surface during polymerisation or applied subsequently. Contact may be made by applying pressure.

Alternatively, the catalyst solution can be applied to the surface of a 'simple' hydrophilic material (e.g. a 75% water uptake hydrophilic material made from 1 part MMA to 4 parts VP with 0.5% allyl MA as a cross-linking agent). The catalyst can be deposited onto the hydrophilic surface in a hydrated or dry state and heat-treated (up to 140° C. if hydrated under pressure). The hydrophilic material can then be used (hydrated or dry) as the transfer material in a process similar to that set out in Process 2, being removed after the ionomer is fully polymerised.

Process 7

In this method, a matrix or frame is supplied to an MEA. This frame may be ionically conductive or non-ionically conductive, electrically conductive or non-electrically conductive, hydrophilic, or non-hydrophilic or a structure incorporating regions of any of the above, depending on the final application.

The frame may be pre-stressed (if it is formed from a cross-linked polymer) to provide the same expansion as the MEA on hydration, or can be used to restrict expansion if required. Alternatively, it may be extended or re-shaped by heat and pressure if it is a thermoplastic, in order to match the hydrated membrane or to minimise internal membrane stress during operation as a cell.

Suitable materials include known plastics selected for being non-ionically and non-electronically conductive and which can be selectively penetrated by the monomers to form interpenetrated network interfaces; see, for example, GB-A-1463301, the content of which is incorporated by reference. Thus, for example, Trogamid CX is almost immune to penetration by vinyl pyrrolidone whereas Trogamid T and Nylon 6 are highly penetrated. These penetrations are not disturbed by the additional ionic ingredients necessary to form an ionomer. It has also been found that various electrode materials from metallic mesh to conductive carbon fibres, will bond as a composite with polymerising ionic monomers.

Selecting a blend of Trogamid CX 80% and Trogamid T 20% gives a nylon which, after a suitable time (30 minutes), the monomer systems have penetrated to a depth of 0.5 mm. Upon polymerisation of this interpenetrated network, the resulting component is electronically and ionically isolated on the bulk of the nylon yet ionically conductive in the bulk of the membrane. In the 0.5 mm of interpenetrated network there is a gradation of property between the two. This technique can be used to create either or both boundaries to a membrane or support posts integral to a membrane.

Clearly, these processes may be used in combination. For example, Process 1 may be used to augment and improve the results from Process 2 or 3.

The following Examples illustrate the invention.

EXAMPLE 1

Holding catalyst-coated electrode material in pressed contact with an ITM-SPE membrane is sufficient to achieve appropriate contact for operation as a fuel cell. Such electrode materials may be carbon cloth or paper, available commercially from suppliers including Etek. Alternatively, a catalyst-coated electrode may be produced via the following method:

A thick ink is made of platinum black powder (Sigma Aldrich) with HPLC grade water. This is spread onto a suitable electrode material (e.g. woven, graphitised carbon fibres) via a scalpel blade or brush. Higher platinum loading may be achieved by then rubbing the electrode material against a flat glass surface that has been finely dusted with small quantities of platinum black powder. The moisture held in the woven carbon fibre structure from the ink enables additional catalyst to be picked up and held on the surface. The electrode material may be dried, e.g. by heating in a vacuum oven at 40° C. for 20 minutes.

The hydrated ITM-SPE membrane is sandwiched between two pieces of catalyst-coated electrode, with the catalyst facing the membrane. The assembly is pressed together between the gas manifolds of the fuel cell. Very good contact is made between the membrane and catalyst, owing to the ability of the membrane to conform readily under low pressure.

EXAMPLE 2

A 130 mm polyethylene sheet is washed and degreased with methanol and cut to size (approx. 70×70 mm). An area of one side of each polyethylene sheet is coated with catalyst (Sigma Aldrich platinum black 52,078-0) via a process that involves making an ink of the platinum black with water (HPLC grade) and a small quantity of mild soap (soap does not have to be used if the polyethylene sheet has been corona-treated).

The platinum black is placed on the surface of the polyethylene in its dry powder form. Small quantities of the water are added until a fine paste consistency is achieved. The catalyst is spread over an appropriate area with a brush, scalpel blade or spatula, at a catalyst loading not exceeding 10 mg/cm$^2$. It is important that the catalyst coating is of the same shape and size on both polyethylene sheets, as they will later need to overlap.

The catalyst-coated polyethylene films are then dried in a vacuum oven at 40° C. for 20 minutes, and flooded with nitrogen.

The dried, catalyst-coated polyethylene sheets are placed on either side of a separator material with catalyst areas overlapping and facing each other (as in FIG. 1). The separator material ensures that there is no electronic contact between catalyst on opposite polyethylene sheets, while defining a thickness for the resulting membrane. 150 mm non-woven polyester fabric cut to the approximate size of the polyethylene sheets is suitable for this purpose.

This assembly is placed in a sealable polyethylene bag, evacuated and flooded with nitrogen. The ionomer liquid is then introduced into the base of the bag and allowed to wick up into the non-woven separator material. Any bubbles may be easily removed by gently sweeping them up and out of the liquid. The bag is then sealed. Pressure is applied externally to the assembly via two rigid polyethylene plates that are secured tightly together. Note that many membranes can be fabricated in the same assembly, and therefore at the same time via this method. The assembly is cured thermally or via gamma irradiation.

The polyethylene sheets are be peeled away to reveal a membrane with catalyst on and incorporated into both surfaces.

On hydration, the membrane undergoes a degree of controllable swelling that results in a soft and flexible structure with a catalyst layer on both sides. The catalyst particles are partially embedded in the surface of the membrane and are available for electronic contact either directly with the gas manifolds of the fuel cell or via an intermediary layer of carbon cloth which assists electronic conduction over the catalyst layer.

EXAMPLE 3

Catalyst-coated electrodes are prepared as described in Example 1. Uniaxial, graphitised carbon fibres are the preferred electrode material in this example.

The electrode material (catalysed surface down) is placed on top of a polyethylene sheet (approx. 130 mm thick) that rests on a flat piece of glass. Using a temperature-controllable heated flat plate (similar to a domestic iron), the carbon fibres are pressed into the polyethylene at a temperature of about 115° C. This results in the polyethylene sticking to the carbon fibres and part-encapsulating the catalyst particles.

Two such structures are placed back to back (polyethylene outermost), sandwiching a piece of non-woven separator material, to ensure no electronic contact between the two carbon fibre structures. The whole assembly is placed in a sealable polyethylene bag and the liquid ionomer mixture is added, in the same way as described in Example 2.

The role of the polyethylene sheet is to prevent the liquid monomer mixture from encapsulating the catalyst layer. If this were to happen the fuel gas would not be able to access the catalyst layer fast enough for practicable fuel cell operation.

After polymerisation, the polyethylene sheets are peeled away to reveal a membrane incorporating carbon fibres in both surfaces as integral electrodes. The catalyst on the surface of the fibres is partially exposed from the surface of the membrane where it is readily accessed by the fuel gas. Electronic contact need only be made to the carbon fibres on each side where they protrude from the edge of the membrane/structure. This enables many novel fuel cell designs or simply for gas manifolds to be made from non-conducting, low density, cheap polymeric materials.

EXAMPLE 4

Two catalyst-coated stainless steel extended mesh electrodes are pressed onto polythene sheet, as described in Example 3. They are then placed parallel to each other, sandwiching a piece of non-woven separator material, to ensure no electronic contact between the two electrode structures. This assembly is placed in a frame of nylon 6 (approx 0.5 mm thick) with a width of 20 mm. The whole assembly is placed in a sealable polyethylene enclosure and the liquid ionomer mixture is added in the same way as described in Example 3.

After polymerisation, the polyethylene enclosure and sheet are peeled away to reveal a membrane incorporating stainless steel mesh in both surfaces as integral electrodes. Any solid polymer that encapsulates the mesh can be gently removed after membrane hydration when gaseous fuels or oxidants are intended for use, or in the case of liquid fuels and oxidants encapsulating the electrode may not cause a significant reduction in performance as the liquid can still readily accessed by the fuel and oxidant liquids, by travelling though the hydrophilic ionomer. Electronic contact need only be made to the stainless steel on each side. This enables many novel fuel cell designs or simply for gas manifolds to be made from non-conducting, low density, cheap polymeric materials.

The invention claimed is:

1. A method for the production of a membrane electrode assembly (MEA), which comprises assembling the components thereof, including a membrane, electrodes and a catalyst, wherein the assembling also comprises:
   depositing solid catalyst particles on the surface of a transfer medium;
   introducing a monomer mixture into the space between two such catalyst-coated transfer media;
   polymerizing the mixture in situ, whereby the catalyst is pressed into the membrane material, thereby forming the membrane in situ; and
   peeling away the transfer media;
   wherein the membrane is hydrophilic and hydratable.

2. The method according to claim 1, wherein the catalyst is present on a surface of at least one of the electrodes.

3. The method according to claim 1, wherein forming the membrane comprises expansion.

4. The method according to claim 1, for the production of a stack of MEAs.

5. A method for the production of a membrane electrode assembly (MEA), which comprises assembling the components thereof, including a membrane, electrodes and a catalyst, wherein the assembling also comprises:
   depositing solid catalyst particles on the surface of an electrode material;
   treating the solid catalyst particles to render the catalyst active and permanently attached to the electrode material;
   introducing a monomer mixture into the space between two such catalyst-coated electrode materials; and
   polymerizing the mixture in situ, whereby the catalyst is pressed into the membrane material thereby forming the membrane in situ;
   wherein the membrane is hydrophilic and hydratable.

6. The method according to claim 5, wherein the catalyst is present on a surface of at least one of the electrodes.

7. The method according to claim 5, wherein forming the membrane comprises expansion.

8. The method according to claim 5, for the production of a stack of MEAs.

9. The method according to claim 5, wherein the catalysed surface of the electrode material is pressed against the surface of a thermoplastic film at a temperature above the glass transition temperature of the film, so that the catalyst particles are partially impressed into the surface of the film.

* * * * *